United States Patent [19]

Müller

[11] Patent Number: 4,667,122
[45] Date of Patent: * May 19, 1987

[54] TACHOGENERATOR FOR SPEED CONTROL OF ELECTRIC MOTORS

[75] Inventor: Rolf Müller, St. Georgen, Fed. Rep. of Germany

[73] Assignee: Papst Motoren KG, St. Georgen, Fed. Rep. of Germany

[*] Notice: The portion of the term of this patent subsequent to May 14, 2002 has been disclaimed.

[21] Appl. No.: 680,327

[22] Filed: Feb. 26, 1985

Related U.S. Application Data

[60] Division of Ser. No. 478,701, Mar. 25, 1983, Pat. No. 4,517,480, which is a continuation of Ser. No. 166,806, Jul. 9, 1980, abandoned.

[51] Int. Cl.$^4$ ............................................. H02K 11/00
[52] U.S. Cl. ................................... 310/68 R; 310/268
[58] Field of Search ................................. 310/68, 268

[56] References Cited

U.S. PATENT DOCUMENTS 4,517,480  5/1985  Müller .............................. 310/268 X Primary Examiner—Donovan F. Duggan
Attorney, Agent, or Firm—Horst M. Kasper

[57] ABSTRACT

A motor has been proposed in German Offenlegungsschrift DI-OS 2,730,142 and corresponding U.S. Pat. No. 4,211,963. The windings of the tacho winding are diposed here next to the stator winding in the flat air gap of the main magnet, and the current changes in the statorwinding induce therefor in the tachowinding voltages interfering with a precise working control. On the other hand would a disposition of the tacho generator at a different position of the motor increase its axial length considerably, especially when a magnetic shielding between the motor and the tachogenerator is provided. Therefore, it is a purpose of the present invention to provide a motor ofthe kind initially cited, which with compact construction and especially short length in direction of its rotation axis provides a low interference tacho signal remaining the same or improving with increasing age of the motor, for example in order to improve in any case, but at least to keep the same the ganging flutter of a speed controlled direct drive motor for a record player.

24 Claims, 6 Drawing Figures

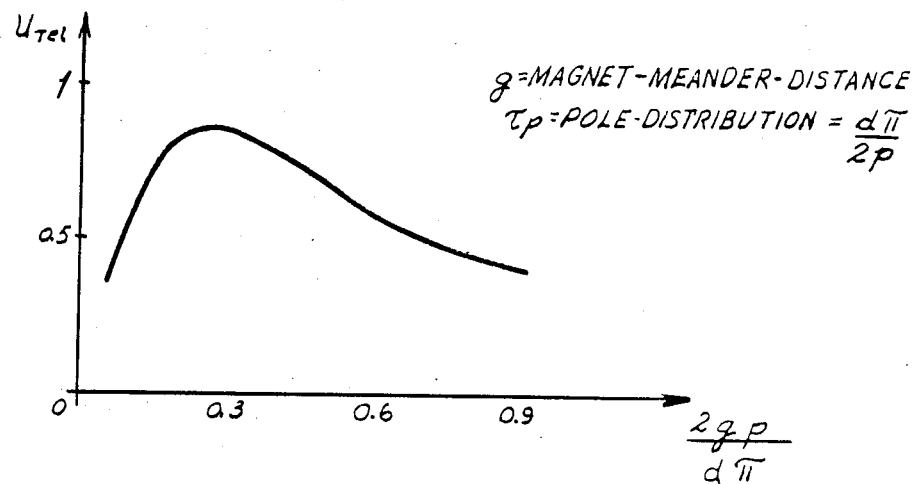
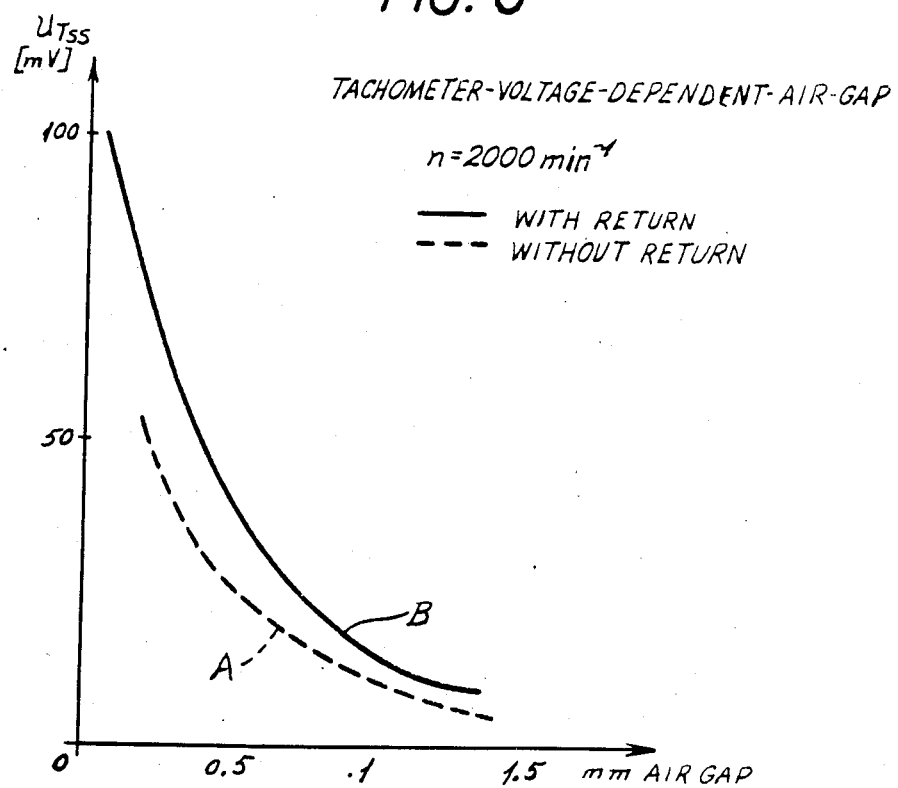

TACHOGENERATOR FOR SPEED CONTROL OF ELECTRIC MOTORS

This application is a divisional application of application Ser. No. 478,701, filed Mar. 25, 1983, now U.S. Pat. No. 4,517,480; in turn a continuation of application Ser. No. 166,806, filed July 9, 1980, now abandoned.

BACKGROUND OF THE INVENTION

Field of the Invention

The present invention relates to a tachogenerator for speed control of electric motors and in particular for brushless d.c. motors.

SUMMARY OF THE INVENTION

The present invention provides a tachogenerator for speed control of electric motors having an axial bearing for compensating the axial forces acting on the motor. A flat multipole permanent magnet is solidly connected to the rotor of the motor and has a number p of pairs of magnetic poles on its surface uniformly arranged on a circle of diameter d for the pole centers. A circular wave winding is solidly connected to the stator and separated from the permanent magnet by a flat air gap of a width g and has a number p of angular substantially repeat units u of the wave winding. The number of pole pairs p follows the formula $$p = (0.5 \text{ to } 1.5) \cdot (d/g)$$

wherein d is the diameter of the centers of the poles, g is the width of the air gap and d and g are measured in the same units.

Preferably the number p of pole pairs is equal to from about 0.8 to 1 times the ratio of the diameter d divided by the width g, with d and g again being measured in the same units. Preferably the diameter d is at least about 10 mm and at most about 100 mm and more preferred is a range of from about 30 mm to 50 mm. Preferably the width g of the air gap is at least about 0.2 mm and at most about 2 mm and more preferred is a range for g of from about 0.5 to 1 mm.

Preferably the number p of pole pairs of the multipole permanent magnet is equal to from about 1 to 2 times the number p of pole pairs corresponding to the maximum induced voltage at the frequency desired.

It can be advantageous for the tachogenerator to comprise in addition to the wave winding a corresponding return winding running in opposite direction to the wave winding for compensating the effect of the wave winding on a magnetic field component in axial direction running through the circle of the wave winding. The wave winding can be a meander winding. The meander winding can be provided by a conductor disposed on a plastic disc by photolithographic techniques.

Also, a soft magnetic material preferably in magnetic shield form can be disposed on the side of the wave winding opposite to the side facing the multipole permanent magnet.

The wave winding is preferably attached to a support tube of the rotor. The multipole permanent magnet is preferably attached to a soft magnetic backing solidly connected to the rotor. The multipole permanent magnet can be a so called rubber magnet and this rubber magnet can be adhesively attached to a soft magnetic material. A preferred electric motor is a two phase brushless d.c. motor which can comprise successively a north pole magnet zone of 120° electrical, a south pole magnet zone of 120° electrical and a remaining zone of 120° electrical having a magnetization which generates in a magnetically active section of the stator winding at a relative motion a substantially zero voltage.

In a preferred embodiment of the invention a brushless d.c. motor with a flat air gap is provided with a tachogenerator for speed control. At least one stator coil is disposed for generating an electromagnetic torque and a rotor magnet arrangement is disposed at a certain distance from the stator coil around a rotation axis. The rotor magnet arrangement is preferably an axially polarized magnet ring. An axial bearing is provided for compensating the axial forces exerted on the rotor, especially as disclosed in German patent application P 2,730,142.4-32 or, respectively, U.S. Pat. No. 4,211,963. In the space between the rotation axis and the rotor magnet arrangement there is disposed a flat multipole permanent magnet and connected to the rotor of the motor in a solid angular relation.

Opposite to the rotor and separated by an air gap which is at least nearly parallel to the air gap of the motor is disposed a wave or meander winding at the stator. A voltage is induced in the wave or meander winding upon operation of the motor by the flat multipole permanent magnet and the frequency of the voltage is proportional to the speed of the motor.

The air gap of the motor on the side opposite to the side facing the rotor magnet can be surrounded by soft ferromagnetic materials for increasing magnetic field strength and these soft ferromagnetic materials and the stator are provided with a feedthrough for the connectors of the wave or meander winding.

Preferably the number p of pole pairs of the multipole flat permanent magnet and the number of the magnetically active sections of the wave or meander winding are selected such that in a diagram, showing the number of pole pairs on the abscissa and the voltage u induced in the wave or meander winding at a constant speed of rotation with a constant frequency n, the number p of pole pairs is in the region of the voltage maximum and preferably above said maximum.

The air gap of the motor can be bordered on the side away from the rotor magnet by stationary soft magnetic materials and these soft magnetic materials can be formed as plates, they can be pierced in their middle by a bearing tube and they can be together with the bearing tube surrounded by plastic.

The plastic can also support the stator winding and at the same time provide insulation.

The size of the maximum of the voltage u depends on the frequency, but does not shift with frequency. Preferred materials for the multipole magnet are hard magnetic materials with high coercitive force such as plastic barium ferrite, sintered barium ferrite or samarium cobalt. When the magnetic pole material demagnetizes, then a lower pole pair number is preferred. By the arrangement of the tachogenerator in the space between the rotation axis and the rotor magnet there results a compact, relatively small arrangement wherein stray fields from the stator winding or from the rotor are less effective in this region as in the air gap of the motor and if desired the stray fields can also be screened by iron sheets or the like in the usual fashion.

Since by experience the axial bearing of the rotor sinks somewhat in with increasing age and therefor the air gap of the tachogenerator decreases, the output voltage increases with increasing age of the motor resulting in an improvement of the uniform running properties with increasing age.

Further details and advantageous embodiments of the invention follow from the below described and in the drawing shown embodiment, which in no way is to be considered as a limitation of the invention, as well as from the subclaims.

It is shown in

FIG. 1 a section through a preferred embodiment of a motor according to the invention, as seen along section line I—I of FIG. 2, FIG. 2 a plan view onto the stator winding of the motor according to FIG. 1, as seen about along the section line II—II of FIG. 1, wherein details of the shaft and its bearing are left out, FIG. 3 a representation on a larger scale when compared to FIGS. 1 and 2 and as seen about along the line III—III of FIG. 1, wherein again the shaft and the bearing arrangement of the motor are not shown, and FIG. 4 a show picture for explaining a preferred embodiment of the tachogenerator.

FIG. 5 shows a diagram of the relative voltage plotted versus the pole pair number p.

FIG. 6 shows a diagram of the relative voltage plotted versus the air gap in mm. Curve A is for a meander winding on a plastic disc and curve B is for a meander winding on a plastic foil supported by a soft magnetic iron sheet.

Figure 1:
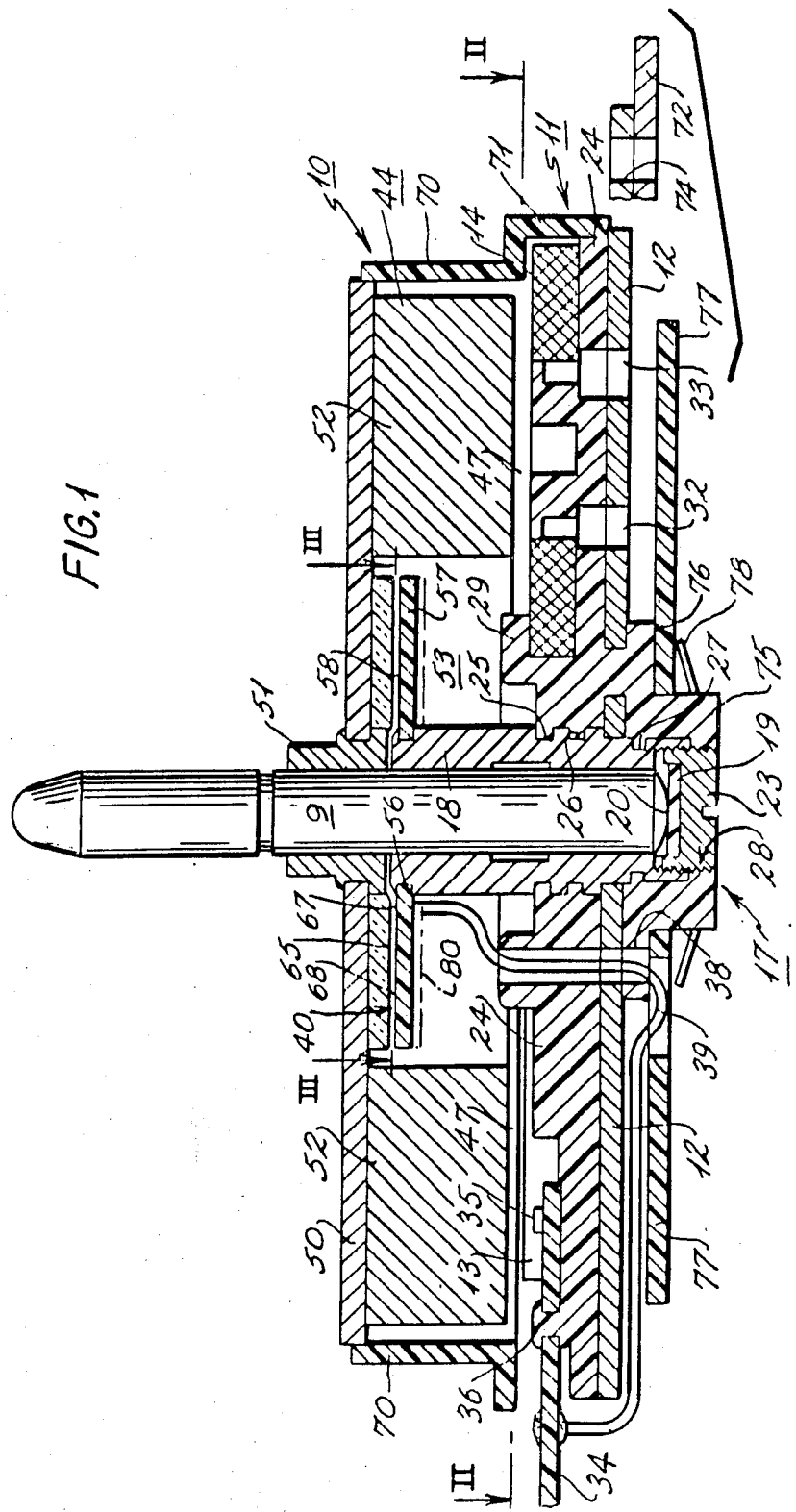
Figure 2:
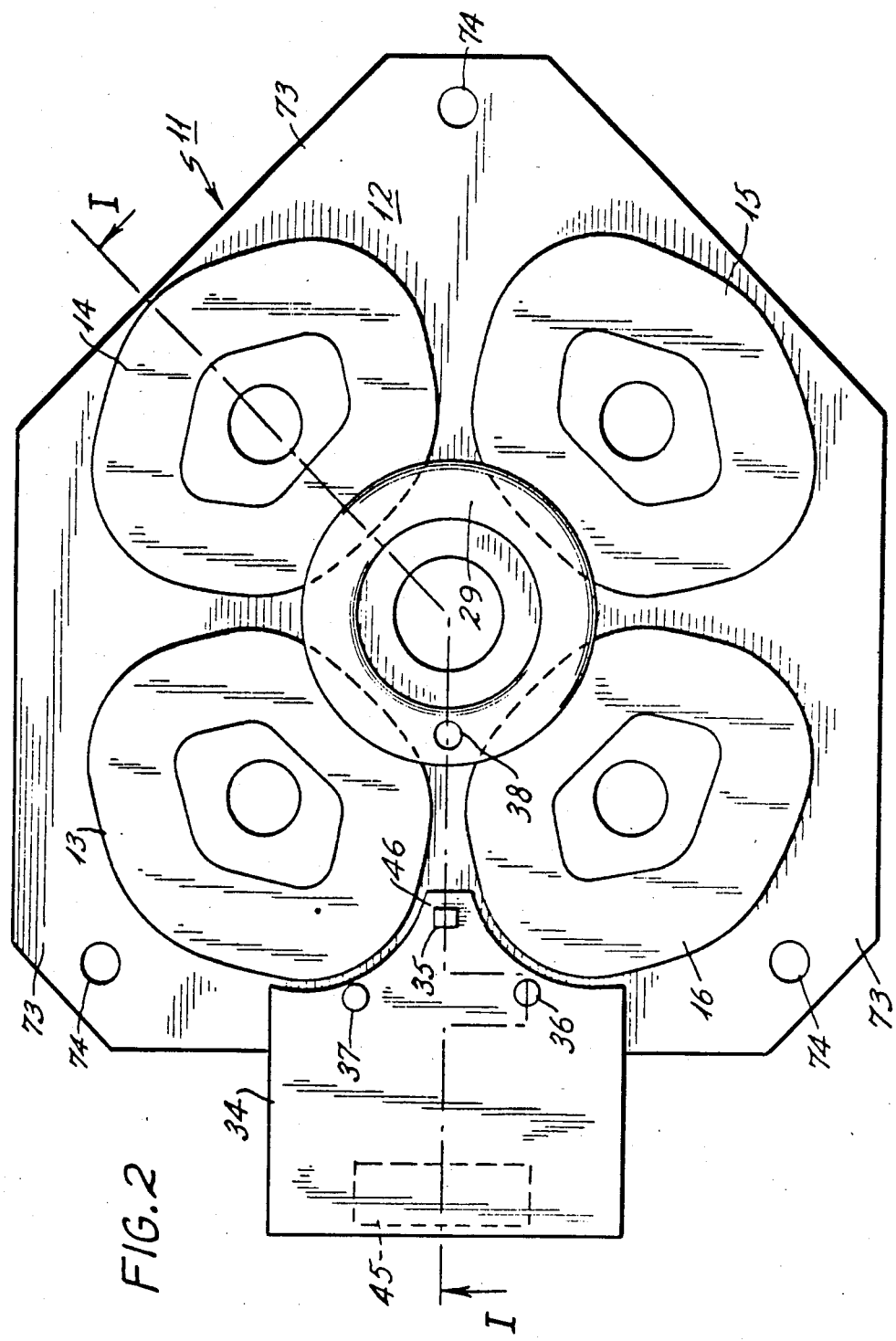

In principle, the motor 10 of FIGS. 1 and 2 is of the same construction as the motor according to FIGS. 8 and 9 of German Offenlegungsschrift DT-OS 2,730,142 or, respectively, U.S. Pat. No. 4,211,963, wherein the coil variant 141 according to said FIG. 9 is employed. Therefor, to avoid superfluous lengths expressly reference is made to the complete description and drawing there.

The stator designated as 11 is provided with a basis plate 12 from a magnetically soft ferromagnetic material, typically iron, which serves as a magnetic short circuit and which carries at the same time the four stator coils 13, 14, 15, 16, an axial bearing 17 and a bearing tube 18 for the rotor shaft designated as 19. The bearing tube 18 is as is usual in slow running motors, formed as a friction bearing, but could of course also be provided with antifriction bearings. The axial bearing 17 is also a friction bearing and is provided with a plastic disc 19, which rests against the trace spherical cap 20 of the shaft 9. Experience has shown that in the course of time this trace spherical cap sinks somewhat into the plastic disc 19, for example by 0.2 ... 0.3 mm, and this circumstance results in an improvement of the quality of the motor in the present invention as is shown in the following. For adjustment of the axial bearing 17 a set screw 23 is provided.

As shown, the basis plate 12 is surrounded with an injection molded plastic piece 24, which (a) attaches the bearing tube 18 safely by penetrating into its ring slots 25,26,27, (b) catches the bolt 23 of the axial bearing 17 in its central bore, (c) serves a guide for the hard to turn set screw 23 provided as a part surrounded by injection molded material, (d) supports the coils 13 to 16 through an upper collar 29, (e) shows hollow spaces 32, 33 coming from protrusions in the injection molding tool for the fixation of the stator coils, (f) supports a conducting plate 34, which serves as a base for a Hall generator or another galvanomagnetic sensor element, by way of two plastic rivets 36, 37, which after the mounting of this conducting plate are made by hot heading of protrusions of the molded piece 24.

In addition, the molded piece 24 and the basis plate 12 comprise a feedthrough 38 for passage of the connecting wires 39 of a tachogenerator designated in total as 40. The wires 39 are conducted to the conducting plate 34 and are there soldered.

The basis plate 12 and the molded plastic piece 24 including the four coils 13 to 16 form together a compact stator 11 including a magnetic short circuit for the rotor designated as 44 of the motor 10. This constructive concept for the stator is of course not only for an arrangement according to the stem patent, but also for all motor principles with standing magnetic short circuit and planar air gap inventively valuable.

On its upper side the conducting plate 34 is provided with a printed circuit and carries further electrical devices 45, for example the power transistors for the control of the coils 13 to 16, resistors, etc. It is adapted in its form to the coils 13 to 16 and extends with a tongue 46 far into the air gap 47 of the rotor 44 in order to provide a large signal at the Hall-generator 35, compare FIG. 1. The conductor plate 34 for example can receive the complete control circuitry of the motor in the form of so called integrated circuits. Then only a few feed wires are necessary to the conducting plate for the operational functioning. If the rivet stumps 36,37 are furthermore supplemented by disengageable fasteners such as bolts, then such an embodiment of the conducting plate represents a very advantageous arrangement for manufacturing and service. When the disengageable fasteners are disposed from the outside as separately disengageable (for example the bolts are radially outside of the rotor 44, wherein the plate 23 or 73 radially correspondingly protrudes), then the motor can be separately produced and the complete electronic circuitry can in the following be additionally mounted in a simple way, which is of equal importance for servicing. Such an embodiment of the conducting plate is equally inventively valuable for other than the motor constructions according to the stem patent application, that is in general for brushless d.c.-motors, especially those with a planar air gap.

The stator coils 13 to 16 are according to the teachings of the German Offenlegungsschrift DT-OS 2,730,142 or, respectively U.S. Pat. No. 4,211,963 wound about as a pentagon and they are disposed equidistantly. The rotor 44 is four pole, that is it is magnetized as shown in FIG. 8 of the German Offenlegungsschrift DT-OS 2,730,142 or, respectively, U.S. Pat. No. 4,211,963. It comprises a magnetic short circuit plate 50 from iron, which is flanged at a bush 51, which bush in turn is pressed to the shaft 19 and it is thereby solidly connected to the same. A magnetic ring 52 from an oxide magnetic material is adhesively attached to the magnetic short circuit plate 50 and is axially magnetized as explained.

Figure 3:
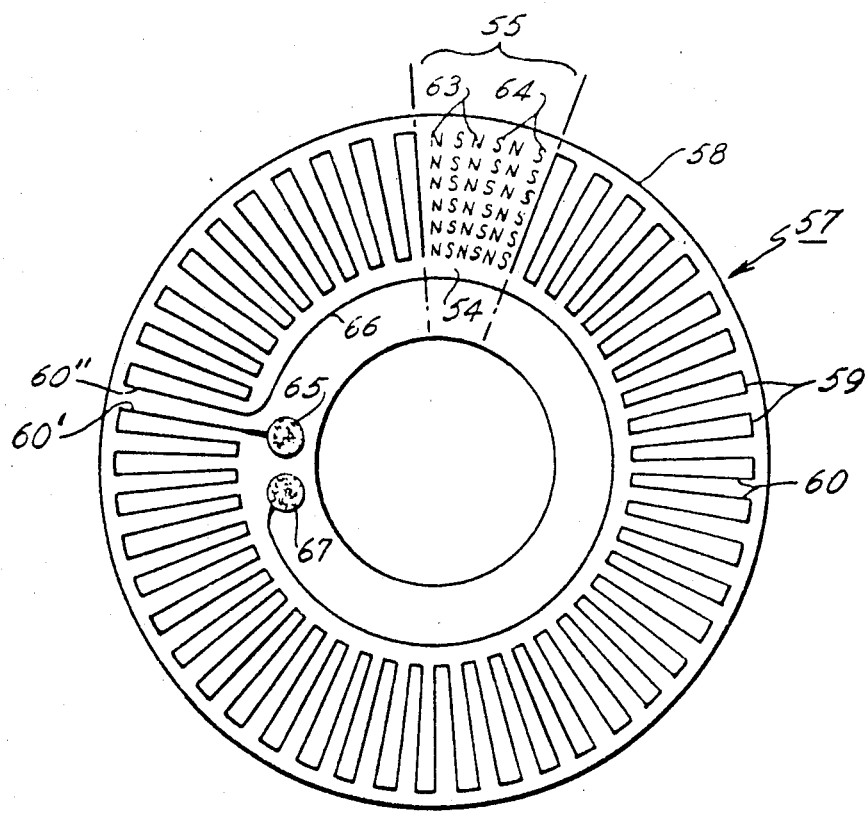

The magnetic ring 52 forms in its interior a hollow space 53 for disposing the tachogenerator 40 in a space saving way. The tachogenerator comprises a magnetic plate 54, which advantageously can be a so called rubber magnet, that is a mixture of magnetically hard ferrites and of an elastomer. This magnet plate 54 is directly attached to the magnetic short circuit plate 50 and rotates therefor during operation with it. The magnet plate 54 is magnetized alternatively with north and south poles on its down side and preferably comprises a large number of pole pairs to provide a sufficiently high frequency for a frequency control, as is shown for example in FIG. 9 of the German Offenlegungsschrift DT-OS 2 533 187 or, respectively, U.S. Pat. No. 4,174,484. FIG. 3 in a sectional view near 55 shows the kind of magnetization of the plate 54 wherein as usual S means south pole and N means north pole.

Opposite to the magnet plate 54 at the upper end of the bearing tube 18 an isolating plate 57 is flanged in a recess 56. The isolating plate is provided on its upper side 58 with a meander winding 59 formed as a printed circuit and the layout of which is indicated in FIG. 3. In FIG. 3 for example the meanderwinding 59 has a total of 96 d radially running sections 60, and the magnet plate 54 has 48 north poles 63 and 48 south poles 64, that is 48 pole pairs. The meander winding 58 has a first connection 65 leading directly to a radially running section 60'. The section 60'' neighboring section 60' runs to a compensation winding 66, which is led back on the inner side of the meander winding by about 320° to a second connection 67, which is located close by the connection 65. The wires 39 are soldered to the connections 65 and 67.

In case stray fluxes for example those from the stator winding 13 to 16 permeate the meander winding 59 then they induce in the same an interfering voltage $u_1$. At the same time they induce in the compensation winding 66 an interfering voltage $u_2$ which about equals $-u_1$. By connecting the two voltages in series, which of course can be also performed in another way, it is achieved that $(u_1+u_2)$ is about equal zero, that is at the output connectors the interfering voltage is substantially suppressed and only the desired useful voltage is obtained, which is induced in the tachowinding 59 by the magnet plate 54.

Figure 4:
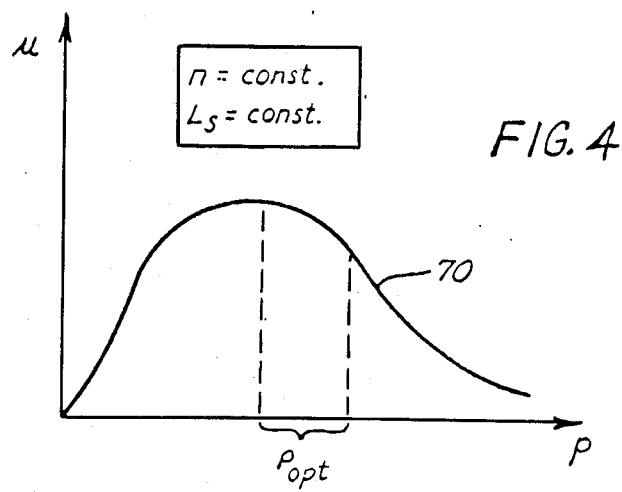

In the selection of the pole pair number p of the magnetic disc 54, and correspondingly also the number of the radially running sections 60 of the meander winding 59, one proceeds according to FIG. 4 with determining the output voltage u for various number of pairs of magnetic poles p with constant remaining air gap 68 width g and with constant remaining frequency of rotation n. The curve 70 resulting has a maximum at $p=p_o$ and for frequency control the area above the maximum $p_o$ is selected, since it is substantially required that the product of frequency and voltage has to be maximized, since with higher frequency a smaller flicker effect results and thereby the control—and also the ganging flutter—improve. This region is indicated in FIG. 4 as range $P_{opt}$ starting at $p_o$ and extending to an upper limit number of poles.

In mounting, the rotor 44 is placed simply with its shaft 19 into the bearing tube 18. Then with the bolt 23 the air gap 68 of the tachogenerator 40 is positioned to for example 0.8 mm and then the motor is allowed to rest for a day. Thereby the trace spherical cap 20 presses to some extent into the plastic disc 19' resulting in an increase in the output voltage of the tachogenerator 40 and the ganging flutter improves when the same is determined on the next day. According to experience the trace spherical cap 20 sinks in successively a little more, that is the ganging flutter improves with increasing age of the motor which of course is very desirable.

A hollow cylindrical part 70 from plastic is disposed around the rotor 44 such that it surrounds the rotor at a very small distance and thereby prevents the entering of foreign bodies into the motor 10. The part 70 is provided with an extended foot 71, which is attached to the stator in the manner shown.

For attachment to a chassis indicated at 72 serve side flanges 73 of the basis plate 12. Mounting holes 74 are provided in these flanges. The basis plate 12 serves at the same time as a magnetic short circuit and as a mounting plate.

The molded plastic piece 24 forms in its middle a kind of protrusion 75 for receiving the set screw 23 for the axial bearing 17. The protrusion 76 forms a ring shoulder. The metallic set screw 23 is placed in the injection mold before the injection molding of the molded plastic piece 24 so that axially below its winding cannot be any plastic. Then by injection molding at the same time in a simple fashion a thread is produced for it. After the injection molding the set screw can only axially be moved downward. The bearing tube 18 could carry at its lower end a thread into which the set screw 23 is turned for support before injection molding.

The present invention is particularly advantageous in connection with a motor according to German Offenlegungsschrift DT-OS 27 30 142 or, respectively, U.S. Pat. No. 4,211,963, since a so called meandertacho in fact provides a small output signal, but a very good/-large ratio of useful to interfering voltage. In a construction according to the stem patent application the stator winding unavoidably generates a strong stray field, compare for example FIG. 2 of the present application, wherein alternatively the two coils 13 and 15 or the two coils 14 and 16 are turned on simultaneously and wherein in each case the coils are polarized equally so that for example upon switching on of the two coils 13 and 15 both have on their upper side a north pole. (For better screening against this and other stray fields below the isolating plate 57 an iron plate 80 can be placed as is indicated by dash-dotted lines in FIG. 1.)

Of course the invention can also be employed with motors having less sizable stray fields, for example to motors according to the German Offenlegungsschrift DT-OS 2,533,187 or, respectively, U.S. Pat. No. 4,174,484 and there especially in the stray field poor coil construction according to the FIGS. 7 and 8, but also to the other coil arrangements, for example according to FIG. 2 of this patent application.

A relatively large distance is provided intentionally for the motor air gap between the permanent magnet ring 52 and the magnetic short circuit part 12 (basis plate) in order to avoid that the axially directed magnetic force becomes to great. It would otherwise press hard onto the axial point bearing and effect there an increased shrinking and thereby possibly an undesirably large axial shifting of position of the rotor, and would also increase friction.

The distance has been selected such that the bearing load of the trace spherical cap 20 becomes not to large and on the other hand the motor still brings the performance required. For this purpose the radius of curvature of the rounding of the motor shaft 9 is made as large as possible.

This distance on the other hand allows a relatively large distance between the coil and the iron magnetic short circuit so that axially between these, for example localized in a recess of the molded plastic part 24, magnetic field sensors (for example one or two Hall-generators) can be disposed advantageously.

When the contact area for the trace spherical cap 20 of the shaft 9 is made from a relatively inexpensive plastic for the larger injection molded part of the housing, for example the molded part 24, then the problem is more severe. Therefor a polyurethane disc is provided as opposing part to the trace spherical cap, that is as a contact sliding element. Such a high value plastic disc, which for example further may comprise a molybdenum sulfide addition, is placed opposite to the trace spherical cap.

The large air gas allows a generous handling of the axial tolerances in mass production such that also a large air gap can be provided between the rotor magnet and the disc coils of the stator, which air gap practically does not have to be considered regarding its manufacturing tolerance. Thus it is possible on the other hand to adjust the rotor for example by the set screw 23 relatively accurate and to go exclusively by the advantageously very narrow air gap of the tachogenerator required for the tachogenerator. This results in a signal gain for the tachogenerator. The motor air gap is about twice as wide as the axial thickness of the stator coils. Initially the air gap of the tachogenerator is set to 0.8 mm, wherein by the shrinking during the life of the motor by at most 0.3 mm an effective air gap of 0.5 mm is formed. Practically this is achieved by providing a so called contact bearing wherein the rounded end of the rotor shaft 9, which is at the same time the rotor shaft of the tachogenerator, rotationally sliding runs against an axially adjustable central element, for example a plastic disc, with the rotor weight and the axial magnetical pull existing between the magnetic short circuit elements 12 and 50. By the pressing according to Hertz at the contact area the axial rotor position changes long term and asymptotically against an end value, however in total this is minimal.

What is claimed is:

1. A tachogenerator for speed control of electric motors having an axial bearing for compensating the axial forces acting on the rotor comprising
   a flat multipole permanent magnet solidly connected to the rotor of the motor and having a number p of pairs of magnetic poles on its surface uniformly arranged on a circle of diameter d for the pole centers,
   a circular wave winding solidly connected to the stator and separated from the permanent magnet by a flat air gap of a width g and having a number p of angular substantially repeat units of the wave winding wherein p is equal to from about 0.5 to 1.5 times the ratio of the diameter d divided by the width g, with d and g being measured in the same units and wherein the pole pair number corresponds to a point of an output voltage of the winding above the maximum output voltage; and
   a corresponding return winding corresponding to the wave winding and disposed running in opposite angular direction to the wave winding for compensating the effect of the wave winding on a magnetic field component in axial direction running through the circle of the wave winding.

2. The tachogenerator according to claim 1 wherein p is equal to from about 0.8 to 1 times the ratio of the diameter d divided by the width g, with d and g being measured in the same units.

3. The tachogenerator according to claim 1 wherein the diameter d is at least about 10 mm.

4. The tachogenerator according to claim 1 wherein the diameter d is at most about 100 mm.

5. The tachogenerator according to claim 1 wherein the diameter d is from about 30 mm to 50 mm.

6. The tachogenerator according to claim 1 wherein the width g of the air gap is at least about 0.2 mm.

7. The tachogenerator according to claim 1 wherein the width g of the air gap is at most about 2 mm.

8. The tachogenerator according to claim 1 wherein the width of the air gap is from about 0.5 to 1 mm.

9. The tachogenerator according to claim 1 wherein the number p of pole pairs is equal to from about 1 to 2 times the number of pole pairs corresponding to the maximum induced voltage at the frequency desired.

10. The tachogenerator according to claim 1 wherein the wave winding is a meander winding.

11. The tachogenerator according to claim 2 wherein the meander winding is provided by a conductor disposed on a plastic disc by photolithographic techniques.

12. The tachogenerator according to claim 1 further comprising a soft magnetic material disposed on the side of the wave winding opposite to the side facing the multipole permanent magnet.

13. The tachogenerator according to claim 12 wherein the soft magnetic material provides a magnetic shield.

14. The tachogenerator according to claim 1 wherein the wave winding is attached to a support tube of the rotor.

15. The tachogenerator according to claim 1 wherein the multipole permanent magnet is attached to a soft magnetic backing solidly connected to the rotor.

16. The tachogenerator according to claim 1 wherein the multipole permanent magnet is a so called rubber magnet.

17. The tachogenerator according to claim 16 wherein the so called rubber magnet is adhesively attached to a soft magnet material.

18. The tachogenerator according to claim 1 wherein the electric motor is a two strand brushless d.c. motor.

19. The tachogenerator according to claim 18 wherein the rotor comprises successively a north pole magnet zone of 120° electrical, a south pole magnet zone of 120° electrical and a remaining zone of 120° electrical having a magnetization generating in a magnetically active section of the stator winding at a relative motion substantially a zero voltage.

20. The tachogenerator according to claim 1 further comprising
   a motor magnetic ring of the rotor forming in its interior a hollow space for disposing the tachogenerator.

21. The tachogenerator according to claim 1 wherein the flat multipole permanent magnet comprises a magnetic plate formed from a rubber magnet.

22. The tachogenerator according to claim 21 further comprising
   a magnetic short circuit plate attached to the magnetic ring of the rotor and wherein the magnet plate is adhesively attached to the magnetic short circuit plate.

23. The tachogenerator according to claim 1 wherein the pole pair number is between a point of the output voltage of the winding corresponding to the maximum output voltage and a value about 50 percent higher.

24. The tachogenerator according to claim 1 wherein the tachogenerator is of the flat air-gap type.

* * * * *

UNITED STATES PATENT AND TRADEMARK OFFICE
CERTIFICATE OF CORRECTION

PATENT NO. : 4,667,122

DATED : May 19, 1987

INVENTOR(S) : Rolf Muller

It is certified that error appears in the above-indentified patent and that said Letters Patent is hereby corrected as shown below:

<u>ON THE COVER PAGE:</u>

Insert Item [30], Foreign Application Priority Data, "July 11, 1979 [DE] Fed. Rep. of Germany P 29 27 958.1".

Signed and Sealed this

Twenty-second Day of April, 1997

Attest:

Attesting Officer

BRUCE LEHMAN

*Commissioner of Patents and Trademarks*